(12) United States Patent
Miyatake

(10) Patent No.: US 7,180,642 B2
(45) Date of Patent: Feb. 20, 2007

(54) IMAGING LENS, IMAGE READER USING THE LENS, AND IMAGING APPARATUS USING THE IMAGE READER

(75) Inventor: Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1088 days.

(21) Appl. No.: 10/139,325

(22) Filed: May 7, 2002

(65) Prior Publication Data

US 2003/0011830 A1    Jan. 16, 2003

(30) Foreign Application Priority Data

May 25, 2001 (JP) ............... 2001-157973
Sep. 19, 2001 (JP) ............... 2001-285578

(51) Int. Cl.
*H04N 1/46* (2006.01)
(52) U.S. Cl. ............. 358/513; 358/505; 359/652; 385/124
(58) Field of Classification Search ............ 358/505, 358/513; 359/652, 642; 385/124
See application file for complete search history.

(56) References Cited

U.S. PATENT DOCUMENTS 5,680,254 A * 10/1997 Ueda et al. ............. 359/652
2003/0011830 A1    1/2003 Miyatake

FOREIGN PATENT DOCUMENTS

| JP | 6-326833 | 11/1994 |
|---|---|---|
| JP | 8-214112 | 8/1996 |
| JP | 2000-307828 | 11/2000 |

OTHER PUBLICATIONS

U.S. Appl. No. 10/139,325, filed May 7, 2002, Miyatake.
U.S. Appl. No. 10/347,746, filed Jan. 22, 2003, Suzuki et al.
U.S. Appl. No. 10/395,128, filed Mar. 25, 2003, Hayashi et al.
U.S. Appl. No. 10/382,530, filed Mar. 7, 2003, Hayashi et al.

(Continued)

*Primary Examiner*—Thomas D. Lee
*Assistant Examiner*—Heather D Gibbs
(74) *Attorney, Agent, or Firm*—Oblon, Spivak, McLelland, Maier & Neustadt, P.C.

(57) ABSTRACT

An imaging lens comprises a first, a second, a third, and a fourth lens group from an object toward an image. The first lens group includes a first lens that is a convex meniscus lens with a convex surface on the object side. The second lens group includes a second lens having a positive refractive power, and a third lens bonded to the second lens and having a negative refractive power. The third lens group includes a fourth lens having a negative refractive power, and a fifth lens bonded to the fourth lens and having a positive refractive power. The fourth lens group includes a sixth lens having a positive refractive power. The imaging lens satisfies the condition $$0.10 < D/f < 0.19$$

where D denotes a sum of an air gap between the first lens and the second lens and an air gap between the fifth lens and the sixth lens, and f denotes a focal length of the entirety of the imaging lens with respect to an e-ray.

13 Claims, 11 Drawing Sheets

OTHER PUBLICATIONS

U.S. Appl. No. 10/421,786, filed Apr. 24, 2003, Atsuumi et al.
U.S. Appl. No. 10/778,032, filed Feb. 17, 2004, Suzuki et al.
U.S. Appl. No. 10/803,991, filed Mar. 19, 2004, Nakajima et al.
U.S. Appl. No. 10/852,183, filed May 25, 2004, Miyatake et al.
U.S. Appl. No. 10/942,907, filed Sep. 17, 2004, Miyatake et al.
U.S. Appl. No. 10/981,677, filed Nov. 5, 2005, Miyatake et al.

* cited by examiner

IMAGING LENS, IMAGE READER USING THE LENS, AND IMAGING APPARATUS USING THE IMAGE READER

BACKGROUND OF THE INVENTION

1. Field of the Invention

The present invention generally relates to a technique for reading an image formed on a medium using solid-state image pickup devices, such as line sensors (e.g., CCDs), as well as to its applications, and more particularly, to an imaging lens, an image reader, and an imaging apparatus using the image reader.

2. Description of the Related Art

In general, image readers applied to imaging apparatuses, such as digital photocopiers, image scanners, or facsimile machines, optically read the image information on an original, and convert the optical image to electric signals. The optical image reflected from the original is reduced and focused on a solid-state image pickup device, such as a CCD array or a line sensor, using the imaging lens furnished in the image reader.

FIG. 1 schematically illustrates an example of the conventional image reader assembled in a digital photocopier. The original 1006 placed on the stage 1001 is scanned in an optical manner. The original is illuminated by the light source 1002a, and the first carriage 1002 including the light source 1002a and the first mirror 1002b moves in the sub scanning direction (i.e., in the feeding direction). The light reflected from the original is guided via the first mirror 1002b to the second mirror 1003a of the second carriage 1003 that moves in the sub scanning direction at a half speed of the first carriage 1002. The second mirror 1003a reflects the light toward the third mirror 1003b, which then guides the light to the imaging lens 1004. The light image through the imaging lens 1004 comes to focus on the CCD 1005.

The CCD 1005 includes one or more lines of light-receiving elements arranged in the main scanning direction (i.e., orthogonal to the feeding direction), and it converts the light image of the original into electric read signals.

The conventional imaging lens 1004 is designed so as to have a certain resolution over a prescribed threshold level at each image height. However, the actual resolution levels vary among image heights due to variation in the imaging positions (or the focusing positions) on the solid-state image pickup device (e.g., the CCD 1005), especially in the main scanning direction and the sub scanning direction (orthogonal to the main scanning direction). This results in the signal levels output from the light-receiving elements of the solid-state image pickup device (CCD 1005) also differing from each other even if the original has a uniform tone (or density).

The above-described problems in the conventional imaging lens and the image reader are serious because the reproduced image quality deteriorates, and therefore, a technique for outputting more uniform signals from the CCD array at each image height is desired.

Focus adjustment for the optical system of an image reader is generally carried out using a test sheet with black and white stripes. The stripes extend breadthwise (or in the main scanning direction), and are arranged at an equal interval in the sub scanning direction (orthogonal to the main scanning direction). This test sheet is placed on the glass stage 1001 and scanned. The positional relationship between the CCD (or the line sensor) 1005 and the imaging lens 1004 is adjusted so that the magnification (or the reduction ratio) and the output from the CCD (or the line sensor) 1005 are optimized.

However, with this method, only the signal outputs in the main scanning direction of the CCD 1005 are observed during the focus adjustment. If the focus adjustment is carried out based on MTF (modulated transfer function) profiles as illustrated in FIG. 2, inappropriate position A may be selected as a reference to adjust the positional relation between the imaging lens 1004 and the CCD 1005. At position A, which resides in the main (horizontal) OK region, the on-axis resolution indicated by the bold line and the resolution in the main scanning direction indicated by the dashed line exceed the threshold level required to satisfy the spec. However, the resolution in the sub scanning direction indicated by the solid line does not reach the threshold level, and consequently, the resolution of the reproduced image deteriorates in the sub scanning direction. This is because position A shown in FIG. 2 resides also in the sub NG region, and because the MTF profile in the sub scanning direction can not be observed simultaneously with the MTF profile in the main scanning direction during the focus adjustment. If it is found after the focus adjustment that the resolution in the sub scanning direction is insufficient, the positional relation between the imaging lens 1004 and the CCD 1005 has to be adjusted again, and the adjusting process becomes troublesome as a whole.

Japanese patent application laid-open publication No. 8-214112 discloses a focus adjustment technique that can achieve a high resolution. However, with this method, focusing is carried out based on the pre-known performance of an imaging lens, without observing the MTF profile in the sub scanning direction. If the performance of the actually used imaging lens differs from the reference due to variation in the components of the imaging lens within the tolerance, then the focal point can not be correctly brought into the designed position at which the resolutions become optimum in both the main and sub scanning directions.

Another method for achieving high-resolution reproduction is disclosed in Japanese patent application laid-open publication No. 2000-307828. In this publication, the image reader uses an imaging lens including an anamorphic lens. In this method, the imaging lens is rotated about its optical axis in order to correct imbalance between the MTF profiles at left and right image-heights Such imbalance in the MTF profiles is due to eccentricity of the imaging lens caused during lens assembling, and it turns up as an offset of the focal point due to inclination of the image plane. This method can not deal with variations in the sub scanning direction because the tilt of the image plane in the main scanning direction can not be adjusted in the sub scanning direction.

Still another problem to be considered is color adjustment in a color photocopy. A conventional color photocopier uses a 3-line CCD having red (R), green (G), and blue (B) filters, which separate the original color image into three primary colors (R, G, B). In this case, the focal positions of the respective color (R, G, B) images must agree with each other.

FIG. 3 illustrates an imaging defect in the conventional imaging lens. Imaging lenses generally have chromatic aberration on their axes. In the example shown in FIG. 3, green is the reference wavelength, red has a positive chromatic aberration, and blue has a negative chromatic aberration. In this case, a good MTF profile satisfactory over these three colors can not be obtained regardless of whichever the imaging positions $I_1$, $I_2$ and $I_3$ the image plane is brought to.

FIG. 4 illustrates MTF profiles of the RGB primary colors with the image plane coincident with the imaging position $I_1$. Only the blue image exhibits a good MTF profile. To overcome the imbalance in the color image, the chromatic aberrations of the imaging range have to be appropriately corrected over a wide range of wavelength. However, it is very difficult to completely correct the chromatic aberrations. Some expensive glass material may reduce chromatic aberrations to some extent; however, the fabrication cost of the imaging lens increases.

Japanese patent application laid-open publication No. 6-326833 discloses a technique for reducing displacement of the focal positions of a color image by inserting a multiplex dichroic mirror in the optical path between the imaging lens and the CCD. Because this method requires a new component (i.e., the multiplex dichroic mirror), an additional new holder mechanism must be prepared, and the total cost becomes high. Furthermore, the multiplex dichroic mirror is inserted between the imaging lens and the CCD, the therefore, the surface precision of the multiplex dichroic mirror must be maintained very high.

This method also requires the optical path length between the imaging lens and the CCD to be adjusted with high accuracy. Accordingly, the angle and the thickness of the multiplex dichroic mirror must be strictly set to designed values. The unit price of each component inevitably rises, and adjusting time becomes long. Still worse is the problem that adjusting the optical path length causes the magnifications to vary among the different colors.

SUMMARY OF THE INVENTION

The present invention was conceived to overcome the problems in the prior art, and it is one of the objectives of the invention to provide an imaging (or reading) lens that can achieve uniform resolution in both the main and sub scanning directions at each image height of the image pickup device.

It is another object of the invention to provide an image reader that allows easy focus adjustment.

It is still another object of the invention to provide an image reader capable of reading a high-quality color image at high precision.

It is yet another object of the invention to provide an imaging apparatus capable of reproducing an image with a high image quality.

To achieve these objects, in one aspect of the invention, an imaging lens comprising first, second, third, and fourth lens groups from an object toward an image is provided. The first lens group includes a first lens that is a convex meniscus lens with a convex surface on the object side. The second lens group includes a second lens having a positive refractive power, and a third lens bonded to the second lens and having a negative refractive power. The third lens group includes a fourth lens having a negative refractive power, and a fifth lens bonded to the fourth lens and having a positive refractive power. The fourth lens group includes a sixth lens having a positive refractive power. This imaging lens satisfyies the condition $$0.10 < D/f < 0.19 \quad (1)$$

where D denotes the sum of an air gap between the first lens and the second lens and an air gap between the fifth lens and the sixth lens, and f denotes the focal length of the entirety of the imaging lens with respect to an e-ray.

The imaging lens having the above-defined arrangement allows the resolution of the image pickup device to be uniform in both the main and sub scanning directions at each image height.

Preferably, the imaging lens further satisfies the condition $$0.6 < f_1/f < 0.9 \quad (2)$$

where $f_1$ denotes the focal length of the first lens with respect to the e-ray.

The imaging lens further satisfies the condition $$-0.9 < f_{25}/f < -0.6 \quad (3)$$

in addition to conditions (1) and/or (2), where $f_{25}$ denotes the composite focal length of the second through fifth lenses with respect to the e-ray.

By satisfying at least one of conditions (2) and (3), the imaging lens becomes capable of improving the contrast in special high frequency regions.

The imaging lens may satisfy solely condition (2) or (3), without considering condition (1). In another words, the imaging lens satisfies at least one of conditions (1), (2), and (3). In either case, the magnification in actual use is 0.1 or in its vicinity. Such magnification realizes excellent imaging performance and resolution.

In the second aspect of the invention, an imaging reader for reading image information on a medium is provided. The image reader comprises a light source configured to illuminate the medium, an image pickup device for receiving a light beam reflected from the medium, forming a light image and converting the light image to an electric signal, and an imaging lens positioned between the medium and the image pickup device and configured to focus the light beam onto the image pickup device. The imaging lens comprises first, second, third, and fourth lens groups from an object toward an image. The first lens group includes a first lens that is a convex meniscus lens with a convex surface on the object side. The second lens group includes a second lens having a positive refractive power, and a third lens bonded to the second lens and having a negative refractive power. The third lens group includes a fourth lens having a negative refractive power, and a fifth lens bonded to the fourth lens and having a positive refractive power. The fourth lens group includes a sixth lens having a positive refractive power. The imaging lens satisfies at least one of the above-described conditions (1), (2) and (3).

In the third aspect of the invention, an image reader for reading image information on a medium comprises a light source configured to illuminate the medium, an image pickup device configured to receive a light image reflected from the medium and convert the light image to an electric signal, a mirror configured to guide the light image to the image pickup device, an imaging lens positioned between the mirror and the image pickup device and configured to focus the light image onto the image pickup device, and a member having an anamorphic surface and positioned on the light path from the medium to the image pickup device.

By using the member having an anamorphic surface, the signal levels output from the light-receiving elements of the image pickup device can be uniform in both the main and sub scanning direction at each image height, even if the imaging positions of the imaging lens slightly differ in the main and sub scanning directions.

In the fourth aspect of the invention, an image reader for reading image information on a medium comprises a light source configured to illuminate the medium, an image pickup device for receiving a light beam reflected from the medium and converting a light image to an electric signal, a mirror configured to guide the light beam to the image pickup device and having an anamorphic surface, and an imaging lens positioned between the mirror and the image pickup device and configured to focus the light beam onto the image pickup device.

The imaging lens described in the first aspect, and the image readers described in the second through fourth aspects are applicable to an arbitrary imaging apparatus that carries out image scanning to reproduce an image on a medium.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE EMBODIMENTS

The details of the invention will now be described with reference to the attached drawings. The symbols used in the description denote the following parameters.

f: composite focal length of the entire lens system with respect to an e-ray
F/No.: F number
ω: half angle of view
Y: object height
ri: radius of curvature of the $i^{th}$ surface from the object
di: distance from the $i^{th}$ surface to the next surface
nj: index of refraction of the $j^{th}$ lens material from the object
ν j: Abbe number of the $j^{th}$ lens material from the object
ra: radius of curvature of the surface of the contact glass on the object side
rb: radius of-curvature of the surface of the contact glass on the image side
da: thickness of the contact glass
na: index of refraction of the contact glass
ν a: Abbe number of the contact glass <First Embodiment>

Figure 5:
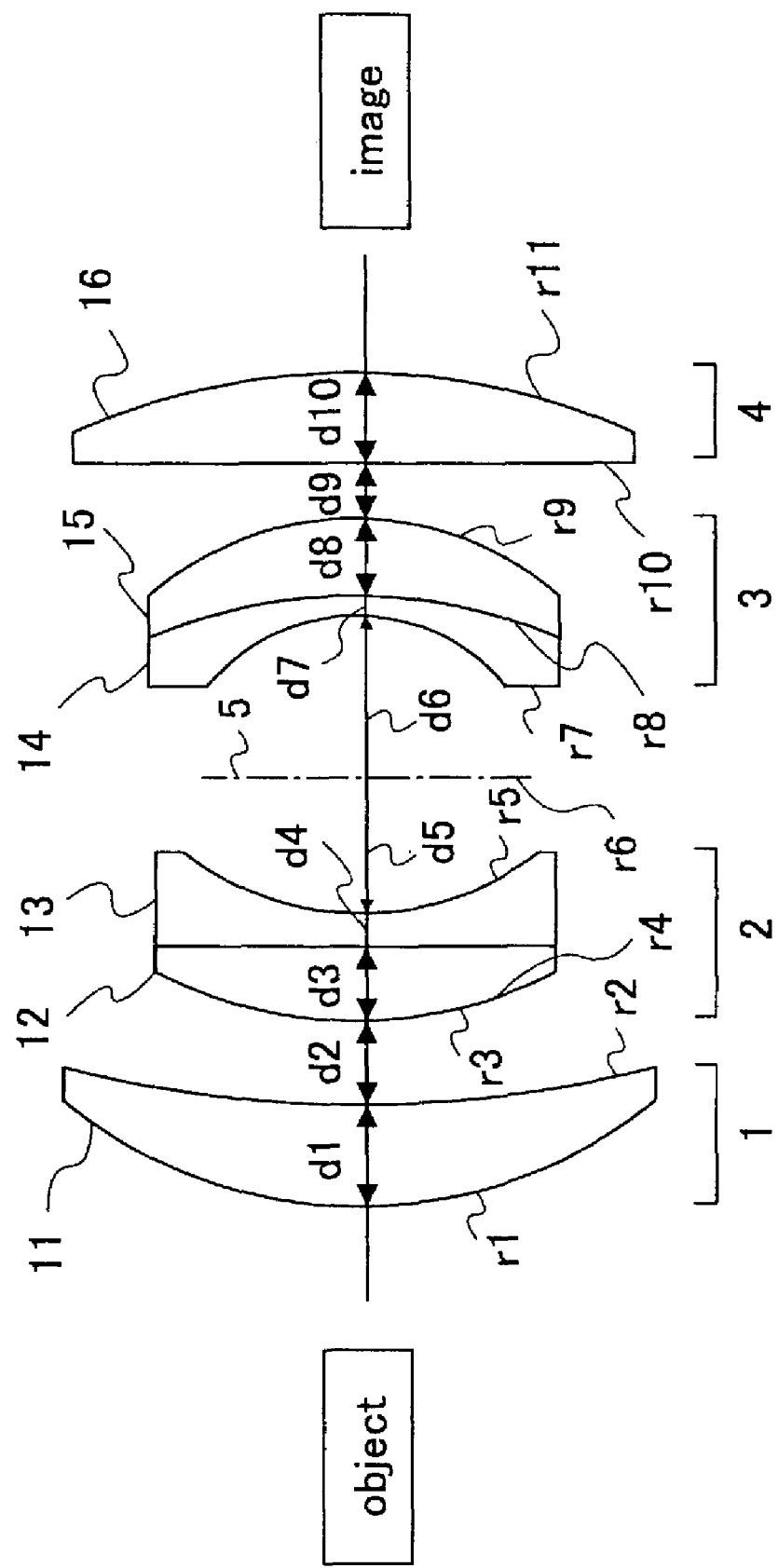
FIG. 5 illustrates an imaging lens according to the first embodiment of the invention.

FIG. 5 illustrates the structure of an imaging lens 10 according to the first embodiment. The imaging lens 10 comprises the first through forth (1–4) lens groups from the object, and a stop (diaphragm) 5 placed between the second and the third lens groups.

The first lens group 1 includes a first lens 11, which is a meniscus lens having a convex surface on the object side. The second lens group 2 includes a second lens 12 with a positive index of refraction, and a third lens 13 bonded to the second lens 12. The third lens group 3 includes a fourth lens 14 with a negative index of refraction, and a fifth lens 15 bonded to the fourth lens 14 and having a positive index of refraction. The fourth lens group 4 includes a sixth lens 16 with a positive index of refraction. This imaging lens has a 4-group 6-lens structure.

The characteristics and the parameters of the lenses 11–16 are listed in Table 1.

TABLE 1

| | f = 50 | | F/No. = 4.0 | | ω = 16.9 | | Y = 152.4 |
|---|---|---|---|---|---|---|---|
| r1 | 22.161 | d1 | 4.86 | n1 | 1.79152 | v1 | 41.3 |
| r2 | 62.677 | d2 | 5.17 | | | | |
| r3 | 20.952 | d3 | 3.42 | n2 | 1.57765 | v2 | 61.1 |
| r4 | −123.257 | d4 | 1.00 | n3 | 1.68962 | v3 | 28.9 |
| r5 | 13.722 | d5 | 4.95 | | | | |
| r6 | Stop | d6 | 8.11 | | | | |
| r7 | −8.586 | d7 | 1.00 | n4 | 1.59300 | v4 | 35.5 |
| r8 | −21.815 | d8 | 3.62 | n5 | 1.71300 | v5 | 53.9 |
| r9 | −12.366 | d9 | 2.68 | | | | |
| r10 | −281.652 | d10 | 3.72 | n6 | 1.74700 | v6 | 47.4 |
| r11 | −28.909 | | | | | | |
| ra | Infinity | Da | 0.70 | Na | 1.51680 | va | 64.2 |
| rb | Infinity | | | | | | |

Figure 6:
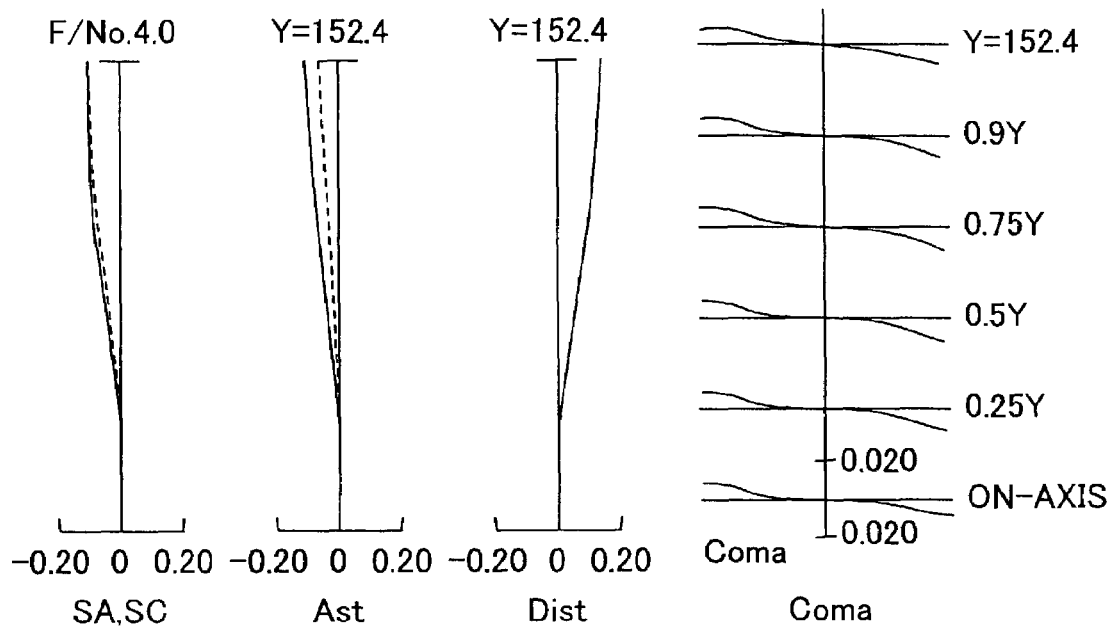
FIG. 6 illustrates the major aberrations of the imaging lens shown in FIG. 5.

FIG. 6 illustrates the spherical aberration, astigmatism, distortion, and coma, from the left to the right of the imaging lens depicted in FIG. 5. Astigmatism is with respect to an e-ray (546.07 nm), and the solid line represents the sagittal rays and the dashed line represents the meridional rays. Concerning the other aberrations shown in FIG. 6, the solid line indicates the aberrations of an e-ray, and the dashed line indicates the aberrations of an f-ray (486.13 nm). These also apply to FIGS. 7–10.

Figure 7:
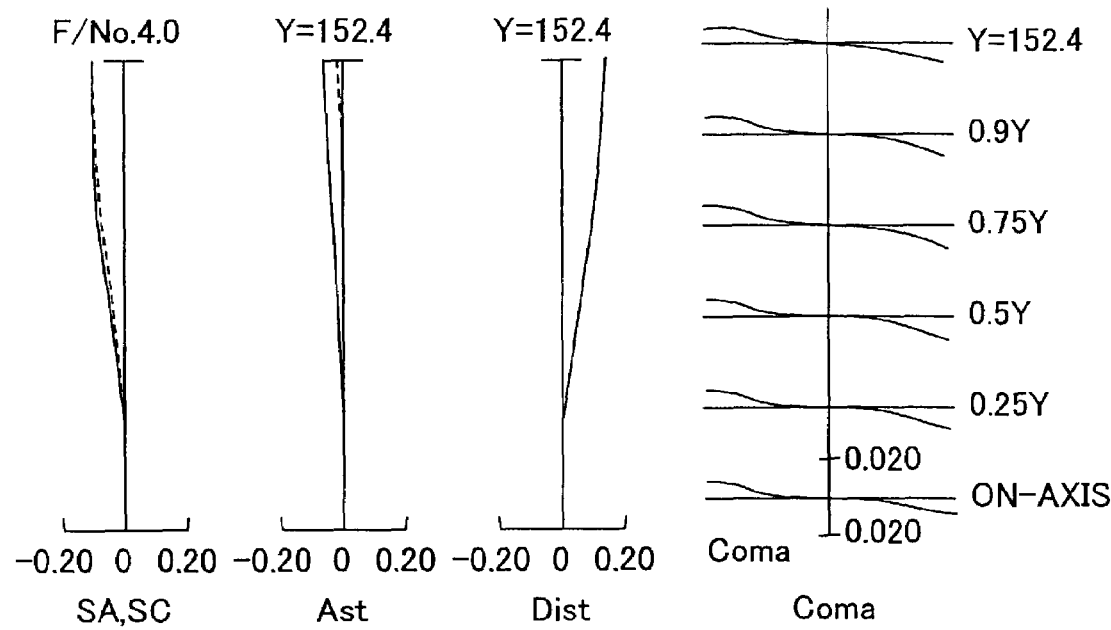
FIG. 7 illustrates the major aberrations of an imaging lens according to the second embodiment of the invention.

FIG. 7 illustrates the same aberrations (i.e., the spherical aberration, astigmatism, distortion, and coma) of a modification (e.g., the second example) of the imaging lens depicted in FIG. 5. The second example has substantially the same lens configuration as illustrated in FIG. 5, but the parameter values of the lenses 11–16 that make up the imaging lens 10 are different. The characteristics and the parameters of the second example are listed in Table 2.

TABLE 2

| | f = 51 | | F/No. = 4.0 | | ω = 16.9 | | Y = 152.4 |
|---|---|---|---|---|---|---|---|
| r1 | 19.726 | d1 | 5.63 | n1 | 1.80610 | v1 | 40.7 |
| r2 | 60.773 | d2 | 1.45 | | | | |
| r3 | 19.886 | d3 | 4.31 | n2 | 1.51633 | v2 | 64.2 |
| r4 | −916.867 | d4 | 1.00 | n3 | 1.74077 | v3 | 27.8 |
| r5 | 13.455 | d5 | 6.39 | | | | |
| r6 | Stop | d6 | 6.61 | | | | |

TABLE 2-continued

| | f = 51 | | F/No. = 4.0 | | ω = 16.9 | | Y = 152.4 |
|---|---|---|---|---|---|---|---|
| r7 | −7.999 | d7 | 1.00 | n4 | 1.62004 | v4 | 36.3 |
| r8 | −15.361 | d8 | 2.90 | n5 | 1.72000 | v5 | 50.3 |
| r9 | −11.131 | d9 | 4.82 | | | | |
| r10 | 2592.702 | D10 | 3.94 | n6 | 1.72000 | v6 | 50.3 |
| r11 | −30.952 | | | | | | |
| ra | Infinity | da | 0.70 | Na | 1.51680 | va | 64.2 |
| rb | Infinity | | | | | | |

Figure 8:
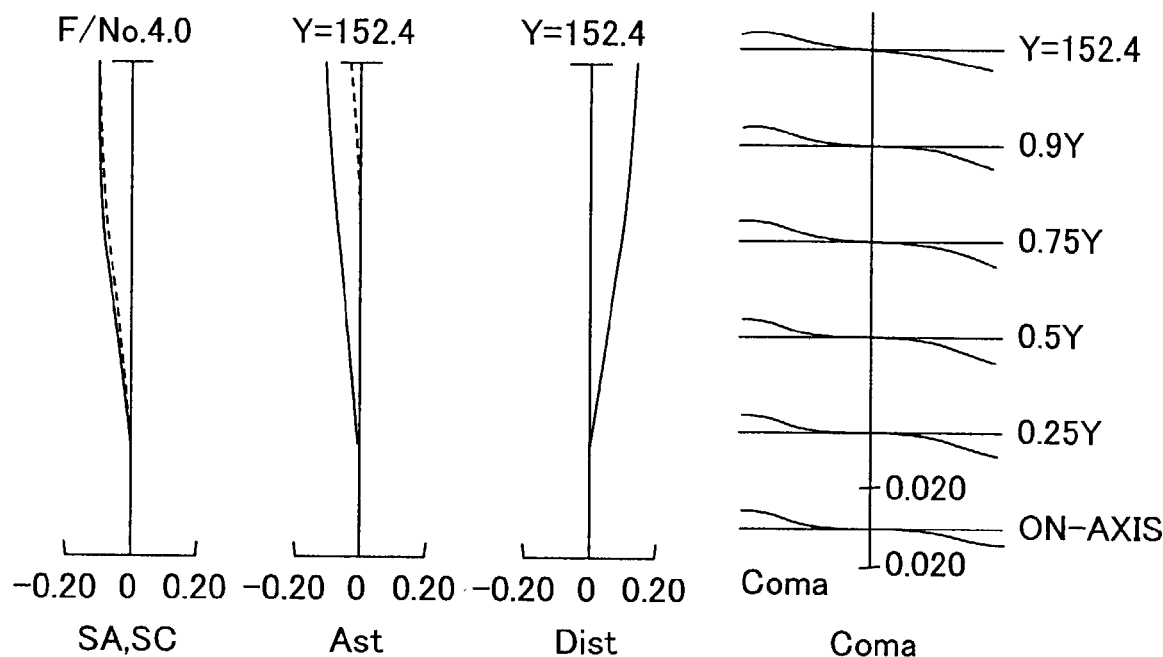
FIG. 8 illustrates the major aberrations of an imaging lens according to the third embodiment of the invention.

FIG. 8 illustrates the spherical aberration, astigmatism, distortion, and coma of another modification (i.e., the third example) of the imaging lens shown in FIG. 5. The third modification also has substantially the same lens structure as shown in FIG. 5, but the parameter values of the lenses 11–16 that make up the imaging lens are different. The characteristics and the parameters of the third modification are listed in Table 3.

TABLE 3

| | f = 50 | | F/No. = 4.0 | | ω = 16.9 | | Y = 152.4 |
|---|---|---|---|---|---|---|---|
| r1 | 20.129 | d1 | 5.50 | n1 | 1.80610 | v1 | 40.7 |
| r2 | 63.048 | d2 | 1.77 | | | | |
| r3 | 20.358 | d3 | 4.15 | n2 | 1.51633 | v2 | 64.2 |
| r4 | −735.382 | d4 | 1.00 | n3 | 1.74077 | v3 | 27.8 |
| r5 | 13.621 | d5 | 6.45 | | | | |
| r6 | Stop | d6 | 6.75 | | | | |
| r7 | −8.063 | d7 | 1.00 | n4 | 1.62004 | v4 | 36.3 |
| r8 | −15.311 | d8 | 2.89 | n5 | 1.74330 | v5 | 49.2 |
| r9 | −11.207 | d9 | 4.14 | | | | |
| r10 | 36381.887 | D10 | 3.80 | n6 | 1.69680 | v6 | 55.5 |
| r11 | −30.008 | | | | | | |
| ra | Infinity | da | 0.70 | Na | 1.51680 | va | 64.2 |
| rb | Infinity | | | | | | |

Figure 9:
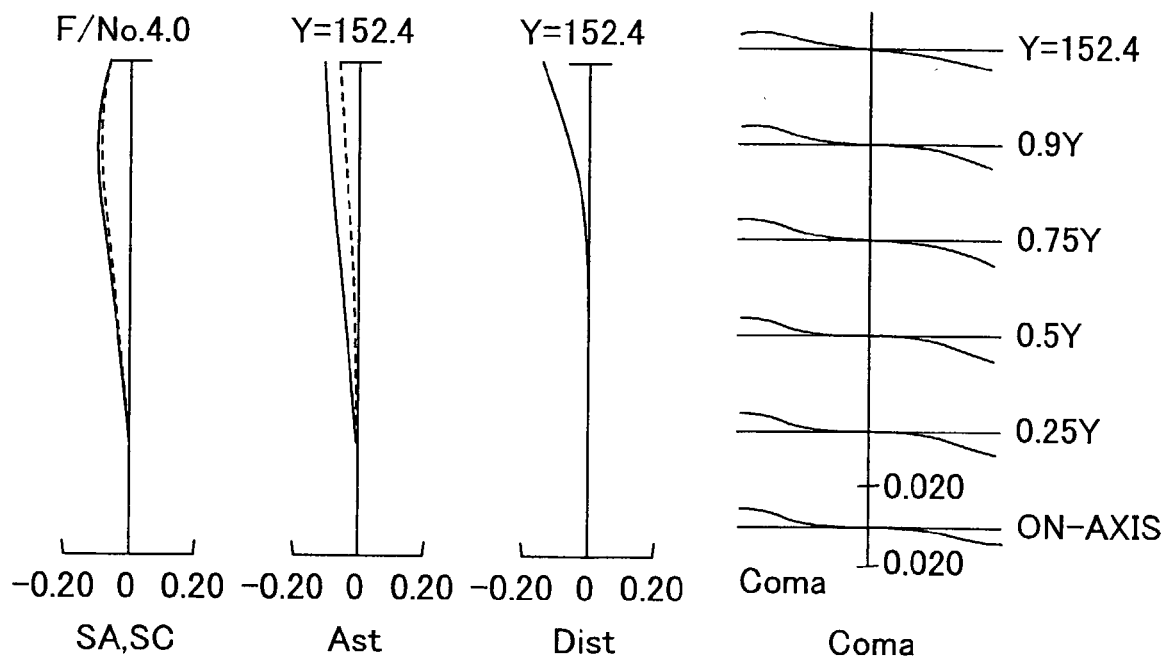
FIG. 9 illustrates the major aberrations of an imaging lens according to the fourth embodiment of the invention.

FIG. 9 illustrates the same aberrations of still another modification (i.e., the fourth example) of the imaging lens shown in FIG. 5. The fourth example also has substantially the same lens structure as shown in FIG. 5, but the parameter values of the lenses 11–16 that make up the imaging lens are different. The characteristics and the parameters of the fourth example are listed in Table 4.

TABLE 4

| | f = 50 | | F/No. = 4.0 | | ω = 16.9 | | Y = 152.4 |
|---|---|---|---|---|---|---|---|
| r1 | 20.953 | d1 | 4.37 | n1 | 1.80610 | v1 | 40.7 |
| r2 | 56.590 | d2 | 3.80 | | | | |
| r3 | 20.691 | d3 | 3.48 | n2 | 1.58913 | v2 | 61.3 |
| r4 | −189.965 | d4 | 1.00 | n3 | 1.69895 | v3 | 30.1 |
| r5 | 13.263 | d5 | 5.26 | | | | |
| r6 | Stop | d6 | 7.90 | | | | |
| r7 | −8.563 | d7 | 1.00 | n4 | 1.62004 | v4 | 36.3 |
| r8 | −18.579 | d8 | 3.25 | n5 | 1.72000 | v5 | 50.3 |
| r9 | −12.031 | d9 | 3.06 | | | | |
| r10 | −334.002 | D10 | 3.78 | n6 | 1.71300 | v6 | 53.9 |
| r11 | −28.015 | | | | | | |
| ra | Infinity | da | 0.70 | Na | 1.51680 | va | 64.2 |
| rb | Infinity | | | | | | |

Figure 10:
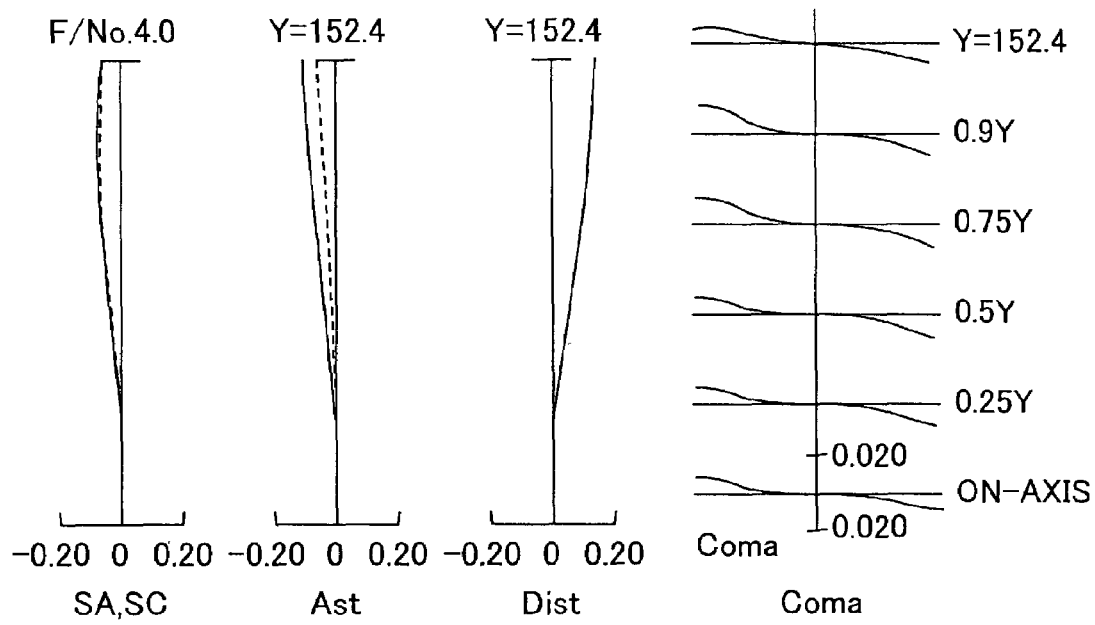
FIG. 10 illustrates the major aberrations of an imaging lens according to the fifth embodiment of the invention.

FIG. 10 illustrates the same aberrations of yet another modification (i.e., the fifth example) of the imaging lens shown in FIG. 5. The fifth example also has substantially the same lens structure as shown in FIG. 5, but the parameter values of the lenses 11–16 that make up the imaging lens are different. The characteristics and the parameters of the fifth example are listed in Table 5.

TABLE 5

| | f = 51 | | F/No. = 4.0 | | ω = 16.9 | | Y = 152.4 |
|---|---|---|---|---|---|---|---|
| r1 | 19.879 | D1 | 4.84 | n1 | 1.83400 | v1 | 40.7 |
| r2 | 52.194 | D2 | 2.49 | | | | |
| r3 | 20.862 | D3 | 3.90 | n2 | 1.62041 | v2 | 61.3 |
| r4 | −276.910 | D4 | 1.00 | n3 | 1.75520 | v3 | 30.1 |
| r5 | 13.680 | D5 | 5.94 | | | | |
| r6 | Stop | D6 | 7.22 | | | | |
| r7 | −7.969 | D7 | 1.00 | n4 | 1.60342 | v4 | 36.3 |
| r8 | −14.088 | D8 | 2.76 | n5 | 1.72000 | v5 | 50.3 |
| r9 | −11.024 | D9 | 5.95 | | | | |
| r10 | −723.284 | D10 | 3.96 | n6 | 1.71300 | v6 | 53.9 |
| r11 | −31.830 | | | | | | |
| ra | Infinity | da | 0.70 | Na | 1.51680 | va | 64.2 |
| rb | Infinity | | | | | | |

All of the above-described imaging lenses of the first embodiment satisfy conditions (1) through (3).

$$0.10 < D/f < 0.19 \tag{1}$$

$$0.6 < f_1/f < 0.9 \tag{2}$$

$$-0.9 < f_{25}/f < -0.6 \tag{3}$$

where D denotes the sum of d2 (i.e., the air gap between the first lens 11 and the second lens 12) and d9 (i.e., the air gap between the fifth lens 15 and the sixth lens 16), f denotes the focal length of the entire lens system with respect to an e-ray, $f_1$ denotes the focal length of the first lens 11, and $f_{25}$ denotes the composite focal length of the second lens 12 through the fifth lens 15.

Table 6 shows the parameter values of D/f, $f_1/f$, and $f_{25}/f$ of the image lenses of the first through fifth examples shown in Tables 1–5 and FIGS. 6–10.

TABLE 6

| | D/f | $f_1/f$ | $f_{25}/f$ |
|---|---|---|---|
| Example 1 | 0.16 | 0.812 | −0.841 |
| Example 2 | 0.12 | 0.672 | −0.653 |
| Example 3 | 0.12 | 0.684 | −0.673 |
| Example 4 | 0.14 | 0.774 | −0.767 |
| Example 5 | 0.17 | 0.707 | −0.725 |

Condition (1) defines the desirable range of the air gaps between the first lens 11 and the second lens 12, and between the fifth lens 15 and the sixth lens 16, in order to bring the imaging positions in agreement with the image plane in both the main and sub scanning directions. In this regard, the imaging lens shown in FIG. 5 may be regarded as consisting of three lens groups of positive, negative, and positive. The first positive lens group includes the first lens 11 having a positive index of refraction. The negative lens group includes the second through fifth lenses 12–15, which as a whole has a negative composite index of refraction. The second positive lens group includes the sixth lens 16 having a positive index of refraction.

In order to make the imaging positions consistent with the image plane in both the main and sub scanning directions, it is necessary to set the Petzval sum small. To achieve this, the incident heights of the positive lens groups are set high, and that of the negative lens group is set small. From this viewpoint, the air gaps between the first lens 11 and the second lens 12 and between the fifth lens 15 and the sixth lens 16 are defined so that the incident height of the positive lens groups are high, while the incident height of the negative lens group is small.

If D/f is below 0.1, which is the lower limit of the condition (1), the Petzval sum becomes large, and as a result, the imaging positions in both the main and sub directions are offset from the target plane. If D/f exceeds 0.19, which is the upper limit of the condition (1), then the first lens 11 and the sixth lens 16 become large, and the lens cost increases. It is desirable to use positive lenses of high index of refraction and negative lenses of low index of refraction for the purpose of reducing the Petzval sum; however, glass materials of high index of refraction are generally expensive. Accordingly, using large positive lenses 11 and 16 of high index of refraction will cause the cost to further increase.

By satisfying condition (1), the imaging can be consistent with the image plane in both the main and sub scanning directions, while maintaining the manufacturing cost low.

Condition (2) defines the power of the first lens group 1. If $f_1/f$ exceeds the upper limit (0.9), the power of the first lens group 1 becomes insufficient, and distortion increases in the negative direction. Also, correction and adjustment of aberrations become very difficult. Below the lower limit (0.6), the power of the first lens group 1 becomes too large. This causes the spherical aberration to increase in the negative direction, and at the same time, the coma increases.

Satisfying condition (2) achieves a high contrast imaging lens 10 that can read an image of high spatial frequency in high contrast.

Condition (3) defines the composite power of the second lens 12 through the fifth lens 15. If $f_{25}/f$ exceeds the upper limit (−0.6), the composite power becomes too large, and coma flare grows larger in an upper ray if the object is placed in the negative direction. Below the lower limit (−0.9), the composite power becomes too small, and as a result, the coma flare in an upper ray grows larger if the object is placed on the negative side.

By satisfying condition (3), the imaging lens is further guaranteed to precisely read images in high spatial frequency regions in high contrast. If both conditions (2) and (3) are satisfied, various aberrations are appropriately corrected, and higher contrast can be achieved even in high spatial frequency regions.

Meanwhile, if the angle of view (2ω) of the imaging lens shown in the first through fifth examples is selected, the assessment frequency rises as the reduction ratio decreases. In this case, the entire aberration has to be further reduced, and therefore, an expensive glass material is required. On the other hand, if the reduction ratio is set larger, the focal length must be elongated, and the imaging lens as a whole becomes large, resulting in increased cost. For these reasons, it is preferable that, with the reduction ratio of about 0.1, at least one of conditions (1) through (3) is satisfied in order to realize a high-performance imaging lens.

Figure 1:
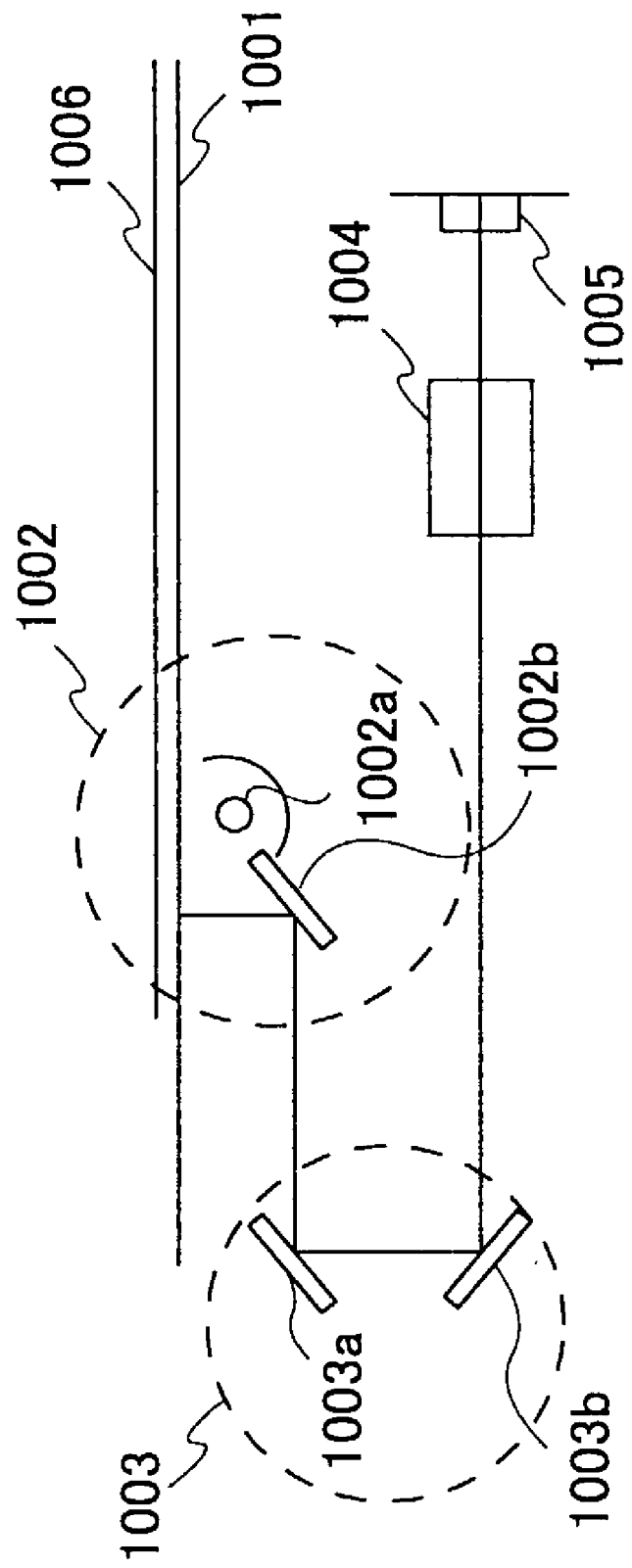
FIG. 1 schematically illustrates the structure of a conventional image reader.
Figure 2:
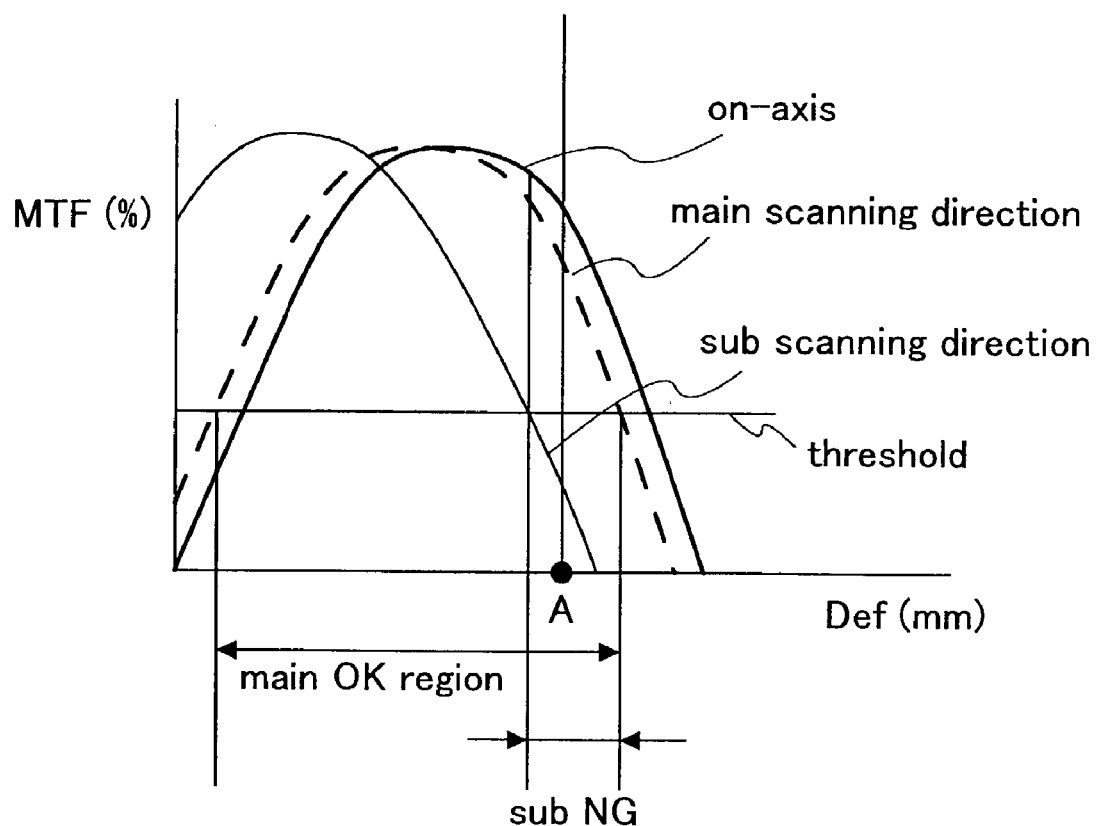
FIG. 2 illustrates MTF profiles computed during focus adjustment in the conventional image reader, which show deterioration of resolution in the sub scanning direction.
Figure 3:
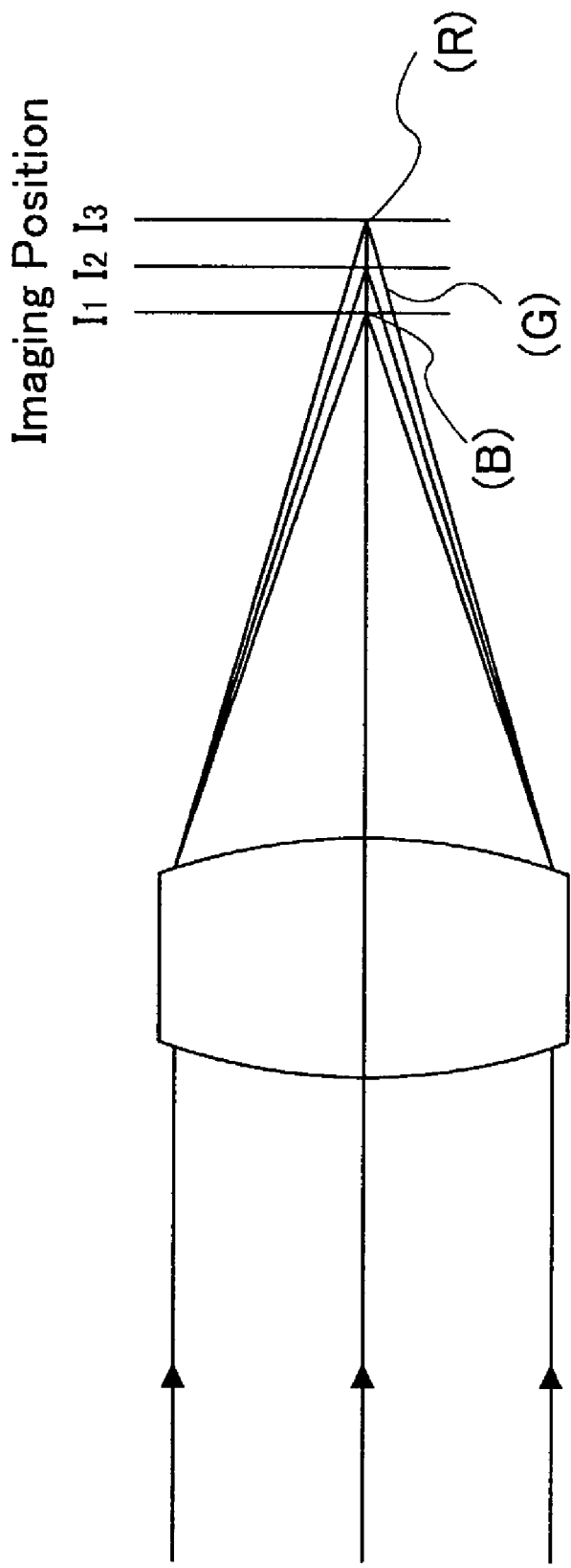
FIG. 3 illustrates a conventional imaging lens with the focal positions of different color images offset from each other.
Figure 4:
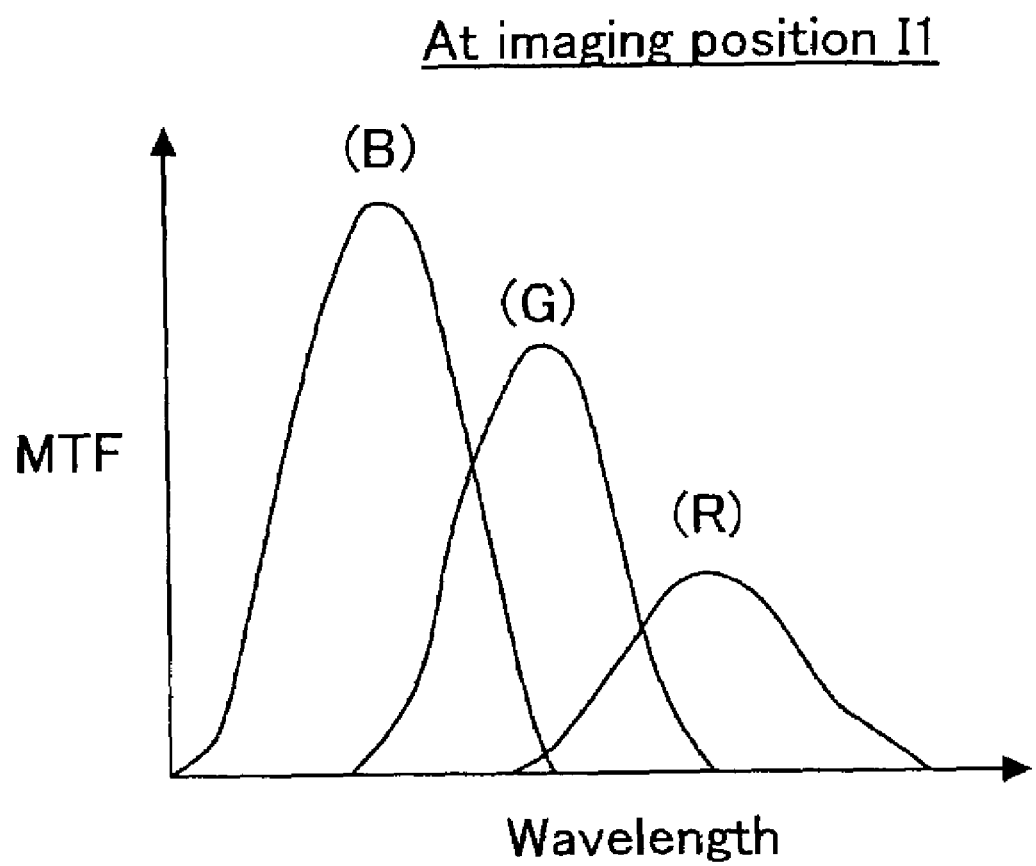
FIG. 4 illustrates the MTF profiles of the respective colors when the image plane is brought to the imaging position $I_1$ shown in FIG. 3.

The above-described imaging lens is applicable to the conventional image reader illustrated in FIG. 1. In this application, the signal levels output from the light-receiving elements of the solid-state image pickup device (CCD) becomes uniform in both the main and sub scanning directions at each image height. In addition, the image information on the original can be read in high contrast even in high spatial frequency regions. The imaging lens of the first embodiment is especially suitable to a high-quality image reader that reproduces an original image at high quality. Such an image reader can be achieved simply by replacing the conventional imaging lens of the image reader with the imaging-lens of the first embodiment, and therefore, pictures and explanation for them will be omitted.

<Second Embodiment>

Figure 11:
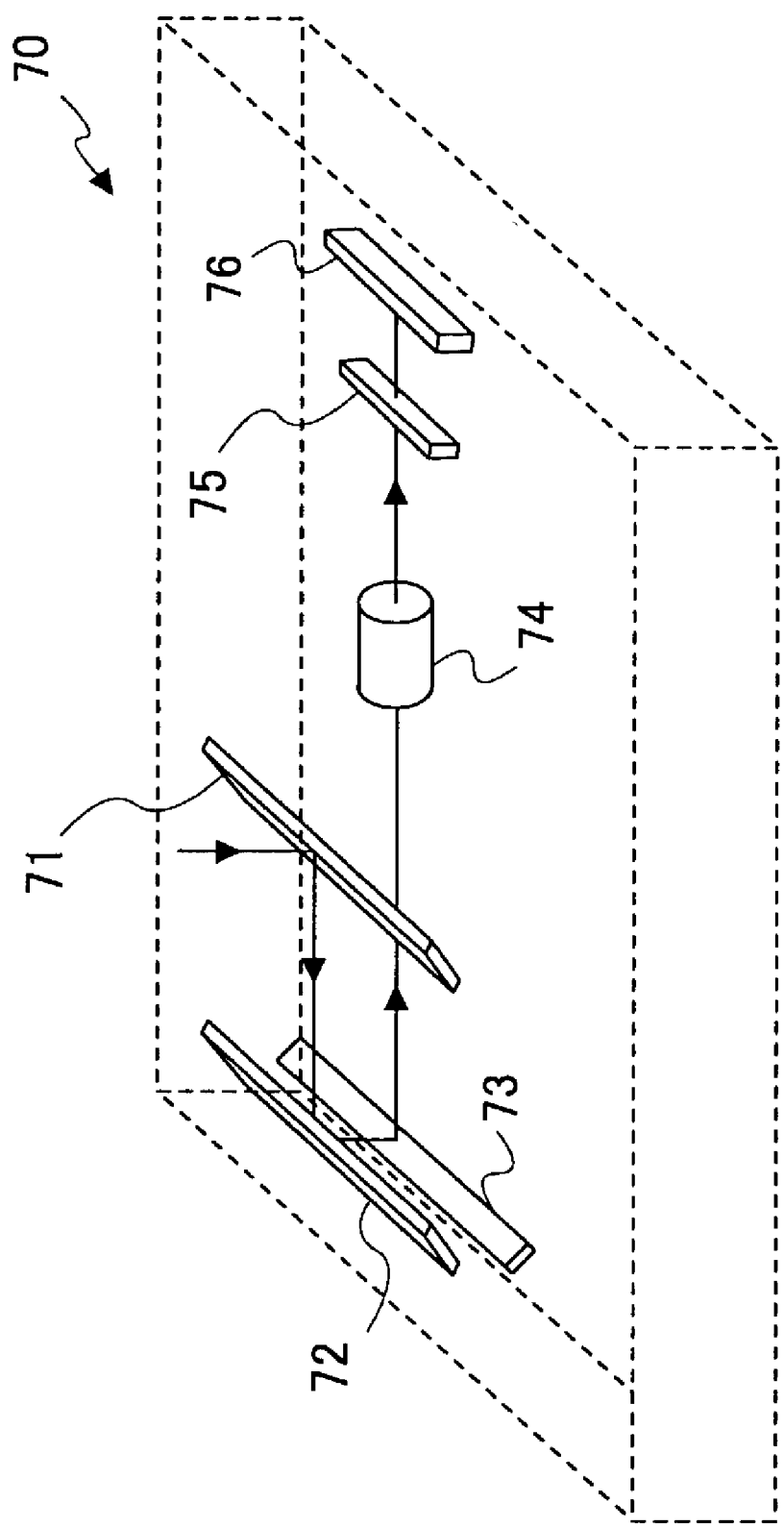
FIG. 11 illustrates an image reader according to the sixth embodiment of the invention using any one of the imaging lenses illustrated in the first through fifth embodiments.

FIG. 11 illustrates an image reader 70 according to the second embodiment. The image reader 70 comprises a light source (not shown) for illuminating an image formed on an original (not shown), a CCD 76, first through third mirrors 71–73 for guiding a light image reflected from the original to the CCD 76, an imaging lens 74 for converging the light image guided by the mirrors 71–73 onto the CCD 76, and a member 75 having an anamorphic surface inserted in the light path from the original to the CCD 76. In the example shown in FIG. 11, the member 75 having at least one anamorphic surface is inserted between the imaging lens 74 and the CCD 76.

The original is placed on a stage (not shown, see FIG. 1), and the image information on the original is scanned, while the image is illuminated by the light source (not shown). The light beam reflected from the original is reflected by the first through third mirrors 71–73, as illustrated in FIG. 11. The first mirror 71 and the light source (not shown) are included in a first carriage (see FIG. 1), and they move in the sub scanning direction. The second and third lenses 72 and 73 are included in a second carriage (see FIG. 1), and they move in the sub scanning direction at a half speed of the first carriage. The CCD 76 has one or more lines of light-receiving elements arranged in the main scanning direction.

The member 75 having an anamorphic surface is used to make the signal levels output from the light-receiving elements of the CCD 76 uniform in both the main and sub scanning directions at each image height. In the example shown in FIG. 11, the member 75 extends in the main scanning direction.

The shape of the anamorphic surface along the main scanning direction is expressed by equation (4).

$$X = Y^2/[R + R(1-(1+k)(Y/R)^2)^{1/2}] + A*Y^4 + B*Y^6 + C*Y^8 + D*Y^{10} + \quad (4)$$

where X denotes a coordinate along the optical axis, Y denotes a coordinate in a direction perpendicular to the optical axis, R denotes a radius of curvature of a close axis, K denotes a conical constant, and A, B, C, D . . . denote high-order coefficients.

The actual shape is defined by inputting specific values in symbols R, K, A, B, C, D . . . . The anamorphic surface may be flat in the main scanning direction, which means that the anamorphic surface may not be refractive in the main scanning direction.

On the other hand, the shape of the anamorphic surface along the sub scanning direction is represented as a radius of curvature $rs_i(Y)$ (i=1, 2, . . . ) at an coordinate Y (i.e., a height) in a direction perpendicular to the optical axis (i.e., in the main scanning direction). $rs_i(Y)$ is expressed by equation (5).

$$rs_i(Y) = a + b*Y^2 + c*Y^4 + d*Y^6 + e*Y^8 + f*Y^{10} + \quad (5)$$

The actual shape of the anamorphic surface in the sub scanning direction is specified by inputting specific values in the coefficients a, b, c, d, e, f . . . .

By inserting the member 75 having the anamorphic surface defined by equations (4) and (5) in the light path of the image reader 70, the power of the image reader 70 can vary in the sub scanning direction at each image height. Consequently, the imaging position can be appropriately adjusted in the sub scanning direction within an image plane at each image height so as to correct undesirable offset of the imaging position in the sub scanning direction due to curvature of the image field.

In addition, because the shape of the anamorphic surface is non-arching in the main scanning direction, the curve of the image plane along the longitudinal axis of the CCD 76 can be corrected in the main scanning direction. Consequently, the imaging positions at each image height can be correctly brought onto the light-receiving elements of the associated height of the CCD 76 in the main scanning direction.

In this manner, the imaging positions can be consistent with the target plane in both the main and sub scanning directions by using the member 75 with the anamorphic surface, and consequently, the signal levels output from the light-receiving elements of the CCD 76 become uniform.

By the way, MTF profiles are likely to be unbalanced between the left and right image heights due to some adverse influence, such as eccentricity during assembling. A known method for overcoming this problem is to rotate the imaging lens 74 about its optical axis in order to change the direction of eccentricity, thereby bringing the peak positions of the MTF profiles at the left and right image heights into agreement with each other to balance the MTF outputs. Since the shape of an anamorphic surface in the main scanning direction differs from that in the sub scanning direction, the anamorphic member inherently has an orientation in the configuration. Therefore, if an anamorphic lens is included in the imaging lens as in JPA2000-307828, the MTF profiles cannot be balanced at the left and right images even if the imaging lens is rotated about its optical axis.

In the second embodiment, a member 75 with an anamorphic surface is inserted in the light path separately from the imaging lens 74, and therefore, the output signal levels from the CCD can be uniform, while well-balanced MTF profiles are maintained.

The member 75 having an anamorphic surface extends in the main scanning direction, and positioning of the member 75 is carried out mechanically, just like an fθ lens used in the optical writing system of a printer or the like, taking the orientation of the anamorphic surface into account. With an image reader using solid-state image pickup devices, such as line CCDs, image information is read along the CCD line extending in the main scanning direction, and therefore, the member 75 is rectangular. The anomorphic surface does not have to be round because it is separated from the imaging lens 74, and the fabrication cost can be reduced.

Figure 12:
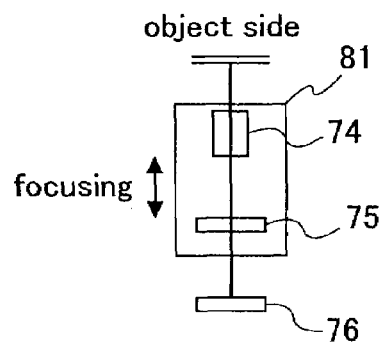
FIG. 12 illustrates a modification of the image reader of the sixth embodiment.

FIG. 12 illustrates a modification of the image reader of the second embodiment. In FIG. 12, the imaging lens 74 and the member 75 with an anamorphic surface are supported on a holder 81 so that the positional relationship between them is fixed. During adjustment of the focal point and the magnification, the position of the holder 81 is simply adjusted along the optical axis, with the relative positions of the imaging lens 74 and the member 75 fixed.

This arrangement is effective because if only the imaging lens 74 is moved, the distance from the imaging lens 74 to the member 75 with the anamorphic surface varies during the adjustment. If the distance from the imaging lens 74 to the member 75 changes, the incident height of light flux onto the anamorphic surface varies, and the imaging positions shift out of the target plane at each image height.

By fixing the positional relationship between the imaging lens 74 and the member 75 on the holder 81, the imaging positions are maintained in agreement with the target plane at each image height even during the focus or magnification adjustment. To this end, it is preferable to insert the member 75 having the anamorphic surface between the imaging lens 74 and the CCD 76.

In general, the image on the original is optically read at a magnification less than 1, for example, in the range form 0.1 to 0.3. Accordingly, it is preferable to insert the member 75 having the anamorphic surface on the image side, rather than on the object side, of the imaging lens 74 for the purpose of making the image reader compact.

The member 75 having an anamorphic surface is fabricated by, for example, three-dimensional cutting or plastic molding. Plastic molding is easy and reliable, and the manufacturing cost is low. However, plastic is weak against temperature change, as compared with glass, because of its linear expansion coefficient. The surface shape may slightly deform due to a temperature change, and the imaging performance may deteriorate. For this reason, if a plastic material is used to fabricate the member 75 with an anamorphic surface, the member 75 is placed close to the image plane at a smaller magnification in order to avoid adverse influence on the imaging performance due to surface deformation.

The anamorphic surface is shaped such that the area on and near the optical axis does not have a refractive power in both the main and sub scanning directions. It is known that, with respect to the performance of the imaging lens 74, the imaging positions of on-axis light flux are substantially consistent in the main and sub scanning directions. If the anamorphic surface has a refractive power in the area near the optical axis, the consistency is lost, and the imaging positions in the main and sub scanning directions separate from each other.

In other words, correction using the anamorphic surface is efficiently performed with respect to off-axis light flux, rather than on-axis flux, because the imaging positions of the off-axis light flux are likely to be displaced in both the main and sub scanning directions. In contrast, on or near the optical axis, the refractive power of the anamorphic surface induces the opposite effect, causing the inherently consistent imaging positions in the main and sub scanning directions to separate from each other.

By setting R and a in equations (4) and (5) to infinity ($\infty$) and by selecting the other coefficients appropriately, an anamorphic surface can bring the imaging positions into consistence with the target plane over-the entire region (including both on-axis and off-axis areas). As a result, the signal levels output from the light-receiving elements of the CCD (the solid-state image pickup device) 76 become uniform at each image height.

The image readers 70 having the anamorphic surface on the member 75 is well-suited to MTF balance adjustment between the left and right image heights, in which the imaging lens is rotated about the optical axis. Even if the focal adjustment is performed based on the MTF profile only in the main scanning direction, the resolutions are improved both in the main and sub scanning directions because of the correction effect of the anamorphic surface. This effect can be enhanced if combined with the imaging lens 10 of the first embodiment.

<Third Embodiment>

Figure 13:
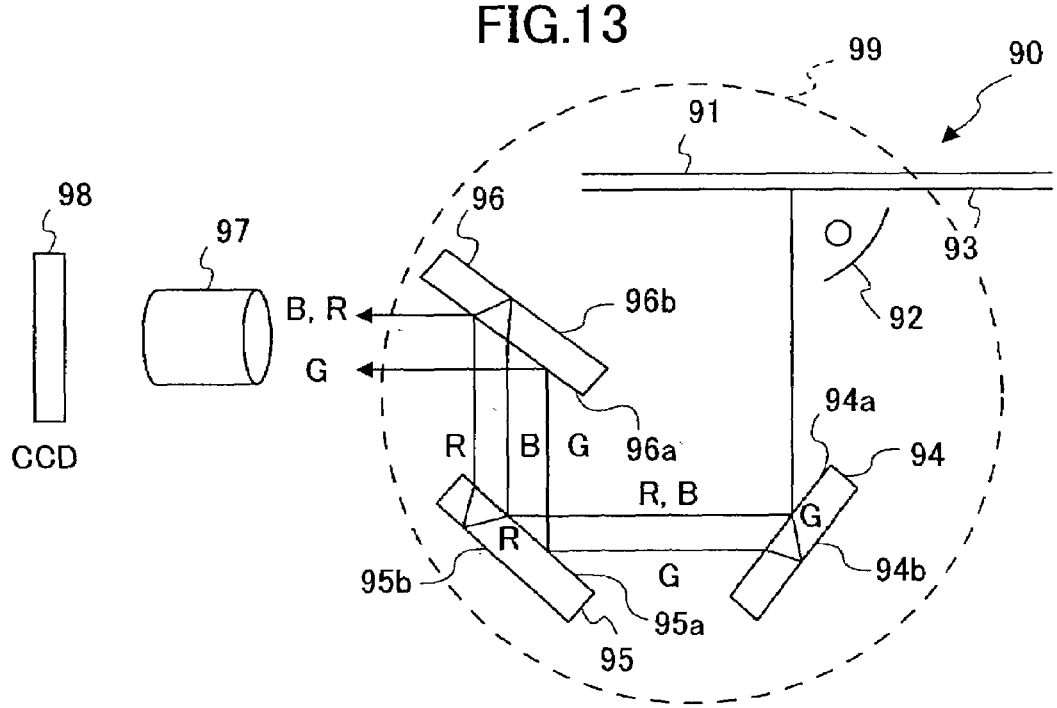
FIG. 13 illustrates an image reader according to the seventh embodiment of the invention.

FIG. 13 schematically illustrates an image reader 90 according to the third embodiment of the invention. In the second embodiment, a member 75 with an anamorphic surface is an independent component, and is inserted in the light path separately from the imaging lens 74 and the mirrors 71–73. In the third embodiment, anamorphic surfaces are provided on the mirrors in order to correct the imaging positions without increasing the number of components of the image reader.

The image reader 90 comprises a light source 92 illuminating an original 91, a CCD 98, first through third mirrors 94–96 for guiding a light image reflected from the original 91 to the CCD 98, an imaging lens 97 for converging the light image guided by the mirrors 94–96 onto the CCD 98. The mirrors 94–96 have anamorphic surfaces 94b–96b, respectively.

The light source 92 and the first through third mirrors 94–96 are included in the first carriage 99. The shapes of each anamorphic surface in the main and sub scanning directions are defined by equation (4) and (5), as in the second embodiment.

It is desirable for the anamorphic surface to be placed at a position where the on-axis light flux and the off-axis light flux are sufficiently separate from each other for the purpose of efficiently correcting the imaging positions of the on-axis and off-axis light fluxes.

All of the first through third mirrors 94–96 are included in the first carriage 99, so that the distance from each mirror to the original 91 or to the imaging lens 97 is maintained constant. This is because if the position of a mirror having the anamorphic surface changes with respect to the original 91 or the imaging lens 97, the light-flux path also changes, and eventually, the effect of the anamorphic surface is lost. With an application of the anamorphic mirror to the conventional image reader shown in FIG. 1, the relative position of the first mirror 1002b with respect to the original and the imaging lens 1004 can be maintained even if the first carriage 1002 is moved in the sub scanning direction during image reading. On the other hand, if the second and third mirror 1003a and 1003b in the second carriage 1003 move in the sub scanning direction, the light flux path changes, and the effect of the anamorphic surface becomes useless.

In the third embodiment, the image reader 90 not only achieves the consistent imaging positions in the main and sub scanning direction at each image height, but also brings the imaging positions of R, G and B into consistency with the target plane. To achieve this, the first through third mirrors 94–96 are furnished with anamorphic surfaces 94b–96b, respectively, so that the R, G, and B signals output from the CCD 98 become uniform at each image height.

In the example shown in FIG. 13, the first mirror 94 has a first surface 94a, which is the incident surface the light beam strikes, and a second surface 94b, which is opposite to the first surface and is the anamorphic surface. Similarly, the second mirror 95 has a first surface (i.e., the incident surface) 95a and a second surface (i.e, the anamorphic surface) 95b. The third mirror 96 has a first surface (i.e., the incident surface) 96a, and a second surface (i.e, the anamorphic surface) 96b.

The first surface 94a of the first mirror 94 allows only green components to pass through, and reflects the other light components. The first surface 95a of the second mirror 95 transmits only red components, and reflects the other components. The first surface 96a of the third mirror 96 transmits only blue components and reflects the other components. The actual shapes of the anamorphic surfaces (i.e., the second surfaces) 94b–96b of the first through third mirrors 94–96, respectively, can be designed so as to optimize the characteristics of the associated colors.

Since the mirrors 94–96 have effects of the anamorphic surfaces independently from each other with respect to the associated colors R, G, and B, displacement of the imaging positions of these primary colors due to chromatic aberration can be efficiently corrected.

FIG. 1 illustrates the light paths of the three colors reading the same line of the original 91; however, it is known that, with a 3-line CCD, the reading positions of R, G, and B are offset from each other in the sub scanning direction.

Displacement of the imaging positions of the primary colors due to the chromatic aberration can also be cancelled by changing the thickness of the mirrors in order to vary the object distances of the respective colors. It is known that if the object distance becomes long, the imaging position shifts toward the imaging lens, and that if the object distance is shortened, the imaging position shifts apart from the imaging lens. Generally, the magnifications of the three primary colors change as the object distances change. However, in the third embodiment, the anamorphic surfaces 94b–96b of the mirrors 94–96 allow the magnifications of the three colors to be consistent with each other.

The number of mirrors used in the image reader 90 is not limited to three although the example shown in FIG. 13 uses the first through third mirrors 94–96. An appropriate number of mirrors can be selected in accordance with the chromatic aberration of the imaging lens 97.

The arrangement shown in FIG. 13 is capable of dealing with color photocopy, keeping the imaging positions of R, G, and B consistent with each other, while the signal levels from the CCD 98 are maintained uniform in both the main and sub scanning directions at each image height.

Each of the anamorphic surfaces 94b–96b of the mirrors 94–96 is designed such that the refractive power of the anamorphic surface is substantially the same in both the main and sub scanning directions on or about the optical axis. As has been explained above, the imaging positions of on-axis flux are consistent with each other in the main and sub directions as the general performance of the imaging lens 97. If the refractive power of the anamorphic surfaces vary in the main and sub directions, the imaging positions of the on-axis flux may separate from each other. Correction using the anamorphic surface is efficient for off-axis flux for which imaging positions vary in the main and sub scanning directions due to the influence of the aberrations of the imaging lens.

For example, the anamorphic surface is shaped such that it does not have refractive power on and about the optical axis in both the main and sub scanning directions, thereby bringing the imaging positions of the on-axis flux into consistency with each other in the main and sub scanning directions.

By setting R and a in equations (4) and (5), and by appropriately selecting the other coefficients, the imaging positions can be made consistent with the target plane over the entire region (including both on-axis and off-axis areas), and consequently, the signal levels output from the light-receiving elements of the CCD 98 can be uniform at each image height.

It is preferable for the mirrors 94–96 with anamorphic surfaces 94b–96b, respectively, to be placed at positions at which the on-axis flux and the off-axis flux are sufficiently separate from each other, that is, apart from the imaging lens 97. This arrangement allows the imaging positions of both the on-axis and off-axis fluxes of each color to be appropriately corrected.

The image reader 90 having the correction effect of the anamorphic surfaces 94b–96b of the mirrors 94–96 is well-suited to MTF balance adjustment between the left and right image heights. Even if the focal adjustment is performed based on the MTF profile only in the main scanning direction, the resolutions are improved both in the main and sub scanning directions because of the effect of the anamorphic surfaces. This effect can be enhanced if combined with the imaging lens 10 of the first embodiment.

In addition, with the image reader 90, the imaging positions of the respective colors (R, G and B) are consistent with each other in both the main and sub scanning directions, and consequently, uniform signal output based on precise reading of a color image can be obtained.

<Fourth Embodiment>

Figure 14:
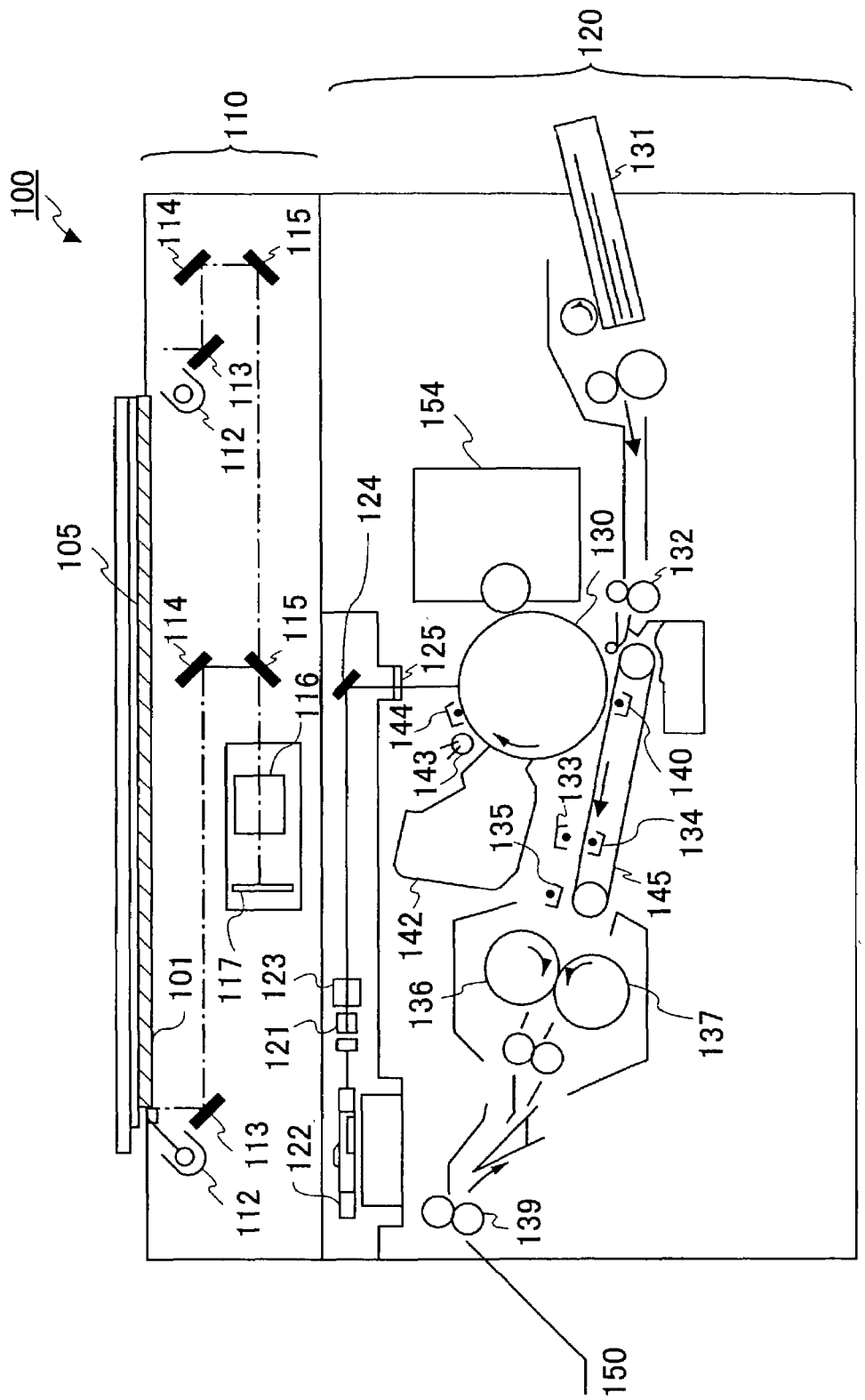
FIG. 14 illustrates an imaging apparatus using any one of the image readers shown in FIGS. 11 through 13.

FIG. 14 illustrates an imaging apparatus 100, such a digital photocopier, which makes use of an imaging lens according to the first embodiment, an image reader described in either the second or third embodiment, or any combination thereof. The imaging apparatus (or the photocopier) 100 comprises an image reader 110 and a printer 120 positioned below the image reader 110.

The image reader 110 includes a light source 112, first through third mirrors 113–115, an imaging lens 116, and a CCD (or an image sensor) 117. The imaging lens 116 is the lens described in the first embodiment, for example. The first through third mirrors 113–115 may have anamorphic surfaces so as to deal with color photocopy, as in the third embodiment, or alternatively, a member having an anamorphic surface may be inserted between the imaging lens 116 and the CCD 117, as in the second embodiment. In the former case, the first through third mirrors 113–115 are included in the first carriage (not shown).

The image reader 110 has a contact glass 101, which functions as a stage on which the original (not shown) is placed. Above the contact glass 101 is a pressing plate 105, which is opened when the original is placed on or removed from the contact glass 101. The light source 112 illuminates the original, and a light image reflected from the original is subsequently reflected by the mirrors 113–115, and strikes the imaging lens 116. The imaging lens focuses the light image on the CCD 117, which converts the light image comprising the image information from the original to electric signals. The signal levels output from the CCD (or the image reader 110) are uniform in both the main and sub scanning directions over the image-formation area because of the lens configuration of the imaging lens 116 and/or the correction effect of the anamorphic surface of a member (not shown) inserted between the imaging lens 116 and the CCD 117. If the first through third mirrors 113–115 have anamorphic surfaces corresponding to the respective colors, the levels of the color signals output from the CCD 117 are uniform over the entire image-formation area.

The image information read by the image reader 110 is input to the printer 120 after it is subjected to predetermined image processing. The printer 120 includes a laser source 121, a polygonal mirror scanner 122, an fθ lens 123, a mirror 124, and a dust protection glass 125. These components constitute an image writing unit of the printer 120.

The laser source 121 emits a laser beam that has been modulated by binary signals representing writing or non-writing according to the outputs from the CCD 117 of the image reader 110. The laser beam is reflected by the polygonal mirror scanner 122, and passes through the fθ lens 123 and a mirror 124. Finally, the laser beam strikes the photosensitive drum 130 through the dust protection glass 125.

Around the photosensitive drum 130 are arranged a cleaning unit 142, a discharge lamp 143, a main charger 144, a development unit 154, a transfer belt 145, a transfer charger 146, etc. If an electrostatic latent image (i.e., a potential distribution) formed on the photosensitive drum 130 by the main charger 144 and the laser beam passes through the development unit 154, toner attaches to the surface of the photosensitive drum 130 according to the electric potential, and a visible image is formed on the drum 130.

Because the laser beam conveys precise image information based on the uniform output from the image reader 110 with well-corrected imaging positions in both the main and sub scanning directions, the visible image is accurately reproduced on the drum 130 with a precise tone and density.

The visible image (i.e., the toner image) is then transferred onto the transfer belt 145. A paper supplied from the cassette 131 is fed to the transfer belt 145 via the resist rollers 132, and the toner image on the transfer belt 145 is transferred onto the paper. The paper is removed from the transfer belt 145 by a separation charger 135. The toner image is then fixed to the paper by fixing rollers 136, and the paper is output to the tray 150. Although the transport path for perfecting (rear-side copy) is omitted from the drawing for the convenience of explanation, the imaging apparatus may have such arbitrary functions.

By applying an imaging lens, an image reader, or any combinations of these according the first through third embodiments to an imaging apparatus 100, a high quality image with precise tone and contrast can be reproduced.

Although the invention has been described using specific examples, the present invention is not limited to those examples, but includes many substitutions and modifications without departing from the scope of the invention. For example, although in the embodiments three mirrors are used, the number of the mirror is not limited to these examples. The image reader is applicable not only to a digital photocopier, but also to a facsimile, a scanner, and other imaging apparatuses.

The member having an anamorphic surface inserted in the optical path may be a mirror that first reflects the light from the original. In this case, the configuration of the conventional image reader can be utilized as it is, in which the first lens is in the first carriage, while the second and third mirrors are in the second carriage.

This patent application is based on and claims the benefit of the earlier filing dates of Japanese patent applications Nos. 2001-157973 and 2001-285578 filed May 25, 2001 and Sep. 19, 2001, respectively, the entire contents of which are hereby incorporated by reference.

What is claimed is:

1. An imaging lens comprising a first, a second, a third, and a fourth lens groups arranged in order from an object toward an image,
   the first lens group including a first lens that is a convex meniscus lens with a convex surface on the object side;
   the second lens group including a second lens having a positive refractive power, and a third lens bonded to the second lens and having a negative refractive power;
   the third lens group including a fourth lens having a negative refractive power, and a fifth lens bonded to the fourth lens and having a positive refractive power; and
   the fourth lens group including a sixth lens having a positive refractive power,
   the imaging lens satisfying the condition $$0.10 < D/f < 0.19$$

where D denotes a sum of an air gap between the first lens and the second lens and an air gap between the fifth lens and the sixth lens, and f denotes a focal length of the entirety of the imaging lens with respect to an e-ray.

2. The imaging lens according to claim 1, further satisfying the condition $$0.6 < f_1/f < 0.9$$

where $f_1$ denotes a focal length of the first lens with respect to the e-ray.

3. The imaging lens according to claim 1, further satisfying the condition $$-0.9 < f_{25}/f < -0.6$$

where $f_{25}$ denotes a composite focal length of the second through fifth lenses with respect to the e-ray.

4. The imaging lens according to claim 2, further satisfying the condition $$-0.9 < f_{25}/f < -0.6$$

where $f_{25}$ denotes a composite focal length of the second through fifth lenses with respect to the e-ray.

5. The imaging lens according to claim 1, having a magnification in use of about 0.1.

6. An imaging lens comprising a first, a second, a third, and a fourth lens groups arranged in order from an object toward an image,
the first lens group including a first lens that is a convex meniscus lens with a convex surface on the object side;
the second lens group including a second lens having a positive refractive power, and a third lens bonded to the second lens and having a negative refractive power;
the third lens group including a fourth lens having a negative refractive power, and a fifth lens bonded to the fourth lens and having a positive refractive power; and
the fourth lens group including a sixth lens having a positive refractive power,
the imaging lens satisfying the condition $$0.6 < f_1/f < 0.9$$

where f denotes a focal length of the entirety of the imaging lens with respect to an e-ray, and $f_1$ denotes a focal length of the first lens with respect to the e-ray.

7. The imaging lens according to claim 6, having a magnification in use of about 0.1.

8. An imaging lens comprising a first, a second, a third, and a fourth lens groups arranged in order from an object toward an image,
the first lens group including a first lens that is a convex meniscus lens with a convex surface on the object side;
the second lens group including a second lens having a positive refractive power, and a third lens bonded to the second lens and having a negative refractive power;
the third lens group including a fourth lens having a negative refractive power, and a fifth lens bonded to the fourth lens and having a positive refractive power; and
the fourth lens group including a sixth lens having a positive refractive power,
the imaging lens satisfying the condition $$-0.9 < f_{25}/f < -0.6$$

where f denotes a focal length of the entirety of the imaging lens with respect to an e-ray, and $f_{25}$ denotes a composite focal length of the second through fifth lenses with respect to the e-ray.

9. The imaging lens according to claim 8, having a magnification in use of about 0.1.

10. An imaging reader for reading image information on a medium comprising
a light source configured to illuminate the medium;
an image pickup device configured to receive a light beam reflected from the medium and convert the light beam to an electric signal; and
an imaging lens positioned between the medium and the image pickup device and configured to focus the light beam onto the image pickup device, the imaging lens comprising a first, a second, a third, and a fourth lens groups arranged in order from the medium toward the image pickup device,
the first lens group including a first lens that is a convex meniscus lens with a convex surface on the object side;
the second lens group including a second lens having a positive refractive power, and a third lens bonded to the second lens and having a negative refractive power;
the third lens group including a fourth lens having a negative refractive power, and a fifth lens bonded to the fourth lens and having a positive refractive power; and
the fourth lens group including a sixth lens having a positive refractive power,
the imaging lens satisfying the condition $$0.10 < D/f < 0.19$$

where D denotes a sum of an air gap between the first lens and the second lens and an air gap between the fifth lens and the sixth lens, and f denotes a focal length of the entirety of the imaging lens with respect to an e-ray.

11. An imaging reader for reading image information on a medium comprising
a light source configured to illuminate the medium;
an image pickup device configured to receive a light beam reflected from the medium and convert the light image to an electric signal; and
an imaging lens positioned between the medium and the image pickup device and configured to focus the light beam onto the image pickup device, the imaging lens comprising a first, a second, a third, and a fourth lens groups arranged in order from the medium toward the image pickup device,
the first lens group including a first lens that is a convex meniscus lens with a convex surface on the object side;
the second lens group including a second lens having a positive refractive power, and a third lens bonded to the second lens and having a negative refractive power;
the third lens group including a fourth lens having a negative refractive power, and a fifth lens bonded to the fourth lens and having a positive refractive power; and
the fourth lens group including a sixth lens having a positive refractive power,
the imaging lens satisfying the condition $$0.6 < f_1/f < 0.9$$

where f denotes a focal length of the entirety of the imaging lens with respect to an e-ray, and $f_1$ denotes a focal length of the first lens with respect to the e-ray.

12. An imaging reader for reading image information on a medium comprising
a light source configured to illuminate the medium;
an image pickup device configured to receive a light beam reflected from the medium and convert the light image to an electric signal; and an imaging lens positioned between the medium and the image pickup device and configured to focus the light beam onto the image pickup device, the imaging lens comprising a first, a second, a third, and a fourth lens groups arranged in order from the medium toward the image pickup device, the first lens group including a first lens that is a convex meniscus lens with a convex surface on the object side;

the second lens group including a second lens having a positive refractive power, and a third lens bonded to the second lens and having a negative refractive power;

the third lens group including a fourth lens having a negative refractive power, and a fifth lens bonded to the fourth lens and having a positive refractive power; and the fourth lens group including a sixth lens having a positive refractive power, the imaging lens satisfying the condition $-0.9 < f_{25}/f < -0.6$ where f denotes a focal length of the entirety of the imaging lens with respect to an e-ray, and $f_{25}$ denotes a composite focal length of the second through fifth lens with respect to the e-ray.

13. An imaging apparatus comprising an image reader configured to read image information from a medium and output an electric signal representing the image information, the image reader including an image pickup device configured to produce the electric signal and an imaging lens configured to focus a light beam from the medium to the image pickup device; and a printer configured to receive the electric signal from the image reader and to reproduce the image information read from the medium, the imaging lens comprising a first, a second, a third, and a fourth lens groups arranged in order from the medium toward the image pickup device, the first lens group including a first lens that is a convex meniscus lens with a convex surface on the object side, the second lens group including a second lens having a positive refractive power and a third lens bonded to the second lens and having a negative refractive power, the third lens group including a fourth lens having a negative refractive power and a fifth lens bonded to the fourth lens and having a positive refractive power, and the fourth lens group including a sixth lens having a positive refractive power, the imaging lens satisfying the condition $0.10 < D/f < 0.19$ where D denotes a sum of an air gap between the first lens and the second lens and an air gap between the fifth lens and the sixth lens, and f denotes a focal length of the entirety of the imaging lens with respect to an e-ray.

* * * * *